United States Patent
Cornolti et al.

(10) Patent No.: US 6,446,766 B1
(45) Date of Patent: Sep. 10, 2002

(54) DISK BRAKE FOR MOTOR VEHICLES AND THE LIKE

(75) Inventors: Raffaello Cornolti, Sorisole; Alberto Previtali, Palazzago, both of (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 09/456,039

(22) Filed: Dec. 6, 1999

(51) Int. Cl.⁷ .............................................. F16D 55/02
(52) U.S. Cl. .................. 188/71.6; 188/264 A; 188/218
(58) Field of Search ............................. 188/71.1, 71.6, 188/264 A, 264 AA, 218 XL

(56) References Cited

U.S. PATENT DOCUMENTS

| | | | |
|---|---|---|---|
| 3,592,298 A | * 7/1971 | Leffert et al. | 188/264 CC |
| 3,664,467 A | * 5/1972 | Lucien et al. | 188/71.6 |
| 3,983,974 A | * 10/1976 | Dowell et al. | 188/264 AA |
| 4,440,270 A | * 4/1984 | Ross | 188/264 AA |
| 5,002,160 A | * 3/1991 | Weiler et al. | 188/71.6 |
| 5,238,090 A | * 8/1993 | Weiler | 188/71.6 |

FOREIGN PATENT DOCUMENTS

| | | | |
|---|---|---|---|
| DE | 1913910 | 4/1965 | |
| DE | 3833552 | 10/1988 | 65/847 |
| GB | 2214581 | * 9/1989 | |
| JP | 62067337 | 3/1987 | 65/847 |
| WO | 8301664 | 5/1983 | 65/847 |

* cited by examiner

Primary Examiner—Jack Lavinder
Assistant Examiner—Mariano Sy
(74) Attorney, Agent, or Firm—Sofer & Haroun, LLP

(57) ABSTRACT

A functionally excellent and structurally simple disk brake with a caliper body formed as a single part constituted by a hub-side elongate element, by a wheel-side elongate element, and by connecting bridges extending astride a disk, hydraulic pressure pistons housed in the elongate elements and acting on respective pads by way of radiator elements, as well as a duct for the passage of cooling air, formed inside the caliper body and extending between the inlet opening and outlet openings facing these radiator elements.

24 Claims, 5 Drawing Sheets

DISK BRAKE FOR MOTOR VEHICLES AND THE LIKE

FIELD OF THE INVENTION

The present invention relates to a disk brake of the type comprising a caliper body, in which a hub-side elongate element, a wheel-side elongate element and connecting bridges extending astride a disk constitute a single part, and pressure means housed in the elongate elements and acting on respective pads by means of radiator elements.

BACKGROUND OF THE INVENTION

Disk brakes of the type specified are particularly suitable for motor vehicles and, in particular, for racing cars or at least high-powered motor vehicles.

As is known, there is a need to prevent the heat generated in the pads during braking from being transmitted through the pistons to the brake fluid. Otherwise, there would be a risk of the brake fluid boiling.

According to the prior art, attempts have been made to direct as much air as possible towards the radiator elements of the pistons so as to form a barrier to the passage of the heat from the pads to the brake fluid.

The various means currently used for directing the air towards the radiator elements are structurally complex and obstruct the handling of the pads and of the caliper body after use of the car, for example, at the end of a race.

The problem upon which the present invention is based is to devise a disk brake of the type specified which has structural and functional characteristics such as to satisfy the aforesaid need and, at the same time, to overcome the problems mentioned with reference to the prior art.

SUMMARY OF THE INVENTION

This problem is solved by a disk brake of the type specified which is characterized in that it comprises a duct for the passage of cooling air, formed inside the caliper body and extending between an inlet opening and at least one outlet opening facing at least one radiator element of the radiator elements.

BRIEF DESCRIPTION OF THE DRAWINGS

Further characteristics and the advantages of the disk brake according to the present invention will become clear from the following description of a preferred embodiment thereof, given by way of non-limiting example, with reference to the appended drawings, in which.

DETAILED DESCRIPTION OF THE PREFERRED EMBODIMENTS

Figure 1:
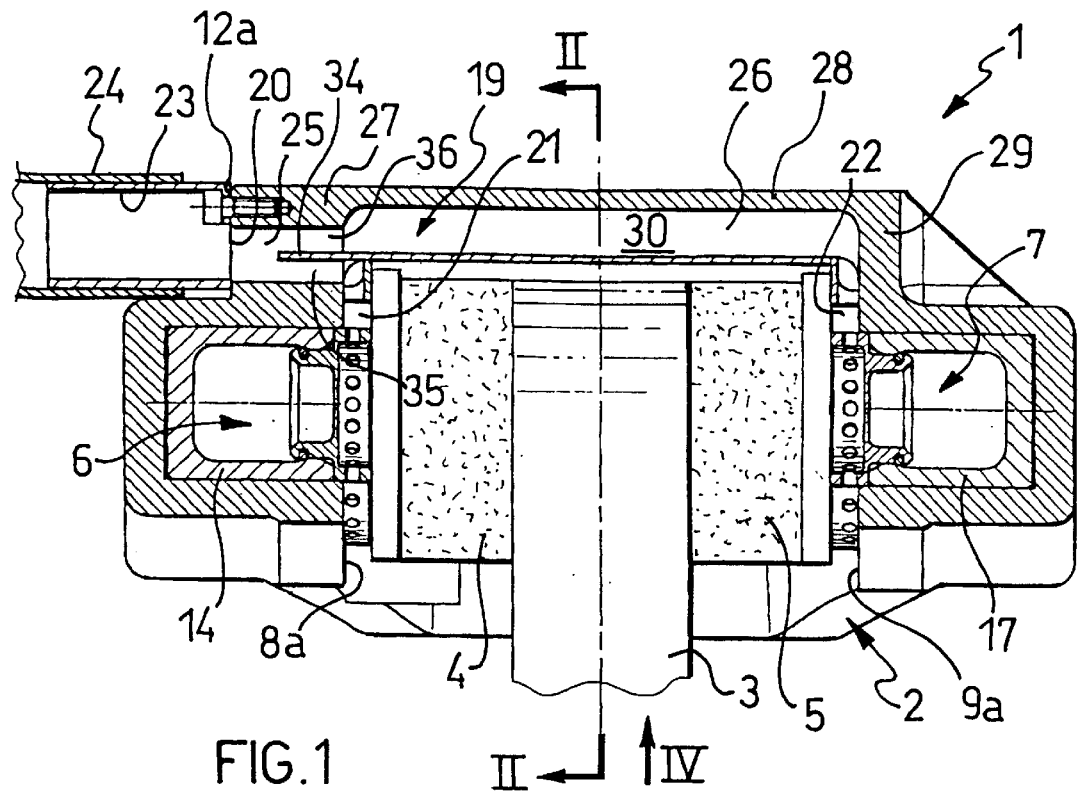
FIG. 1 is an elevational view of a disk brake according to the invention, sectioned on the line I—I.
Figure 2:
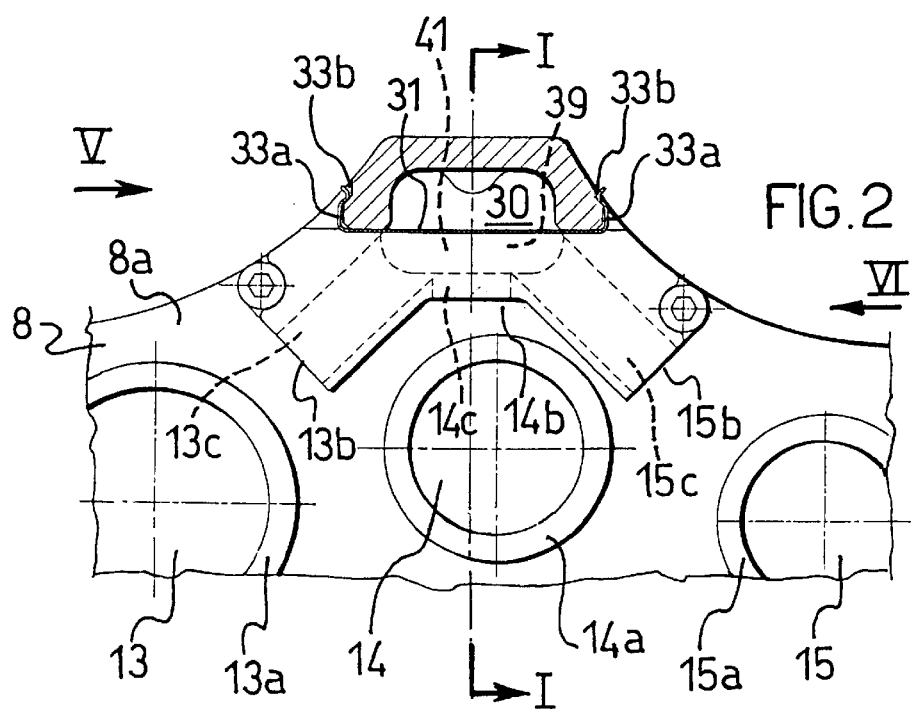
FIG. 2 shows a detail of the disk brake of FIG. 1, sectioned on the line II—II.
Figure 3:
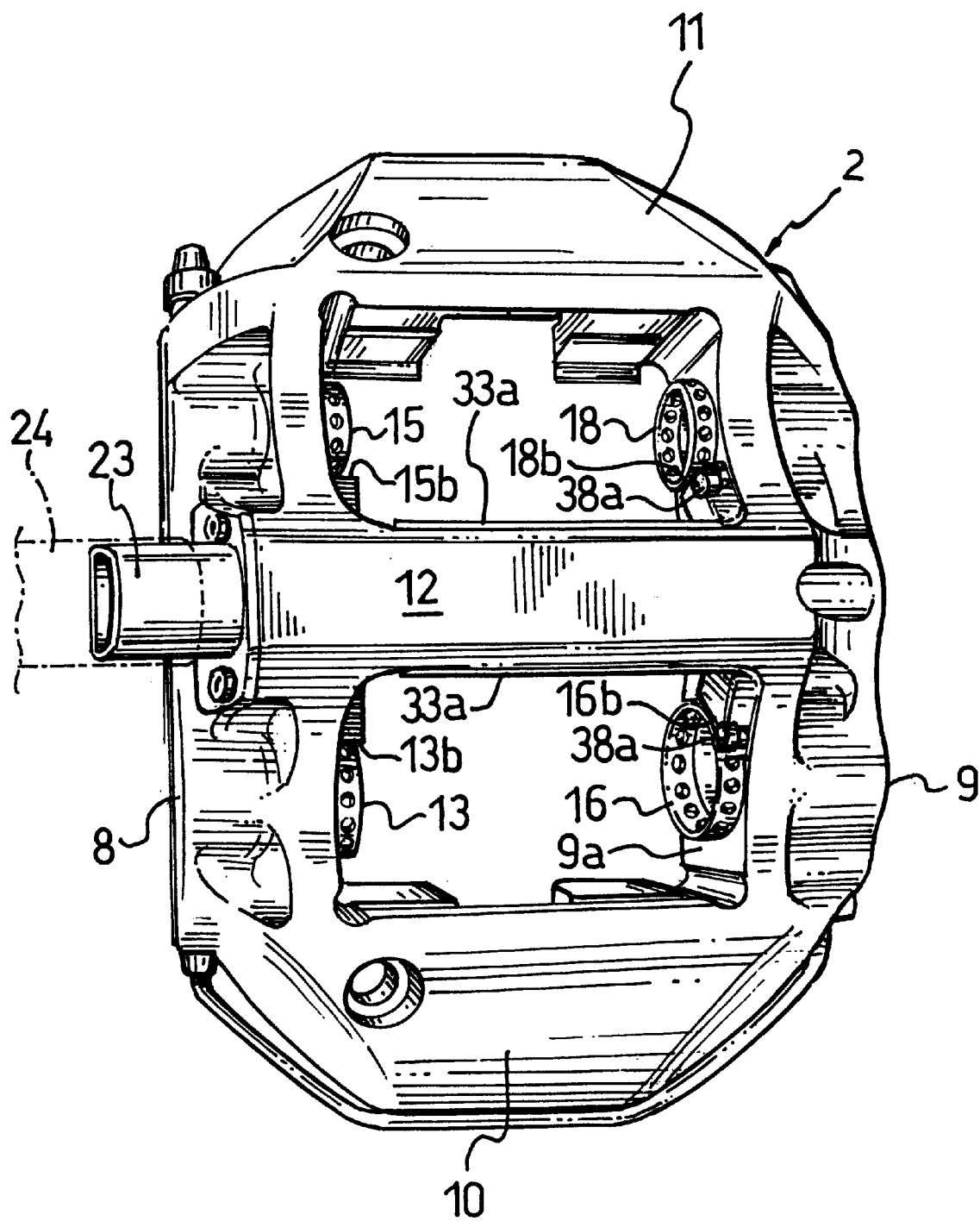
FIG. 3 is a perspective view, taken on the arrow III, showing a detail of the disk brake of FIG. 1, substantially in plan.
Figure 4:
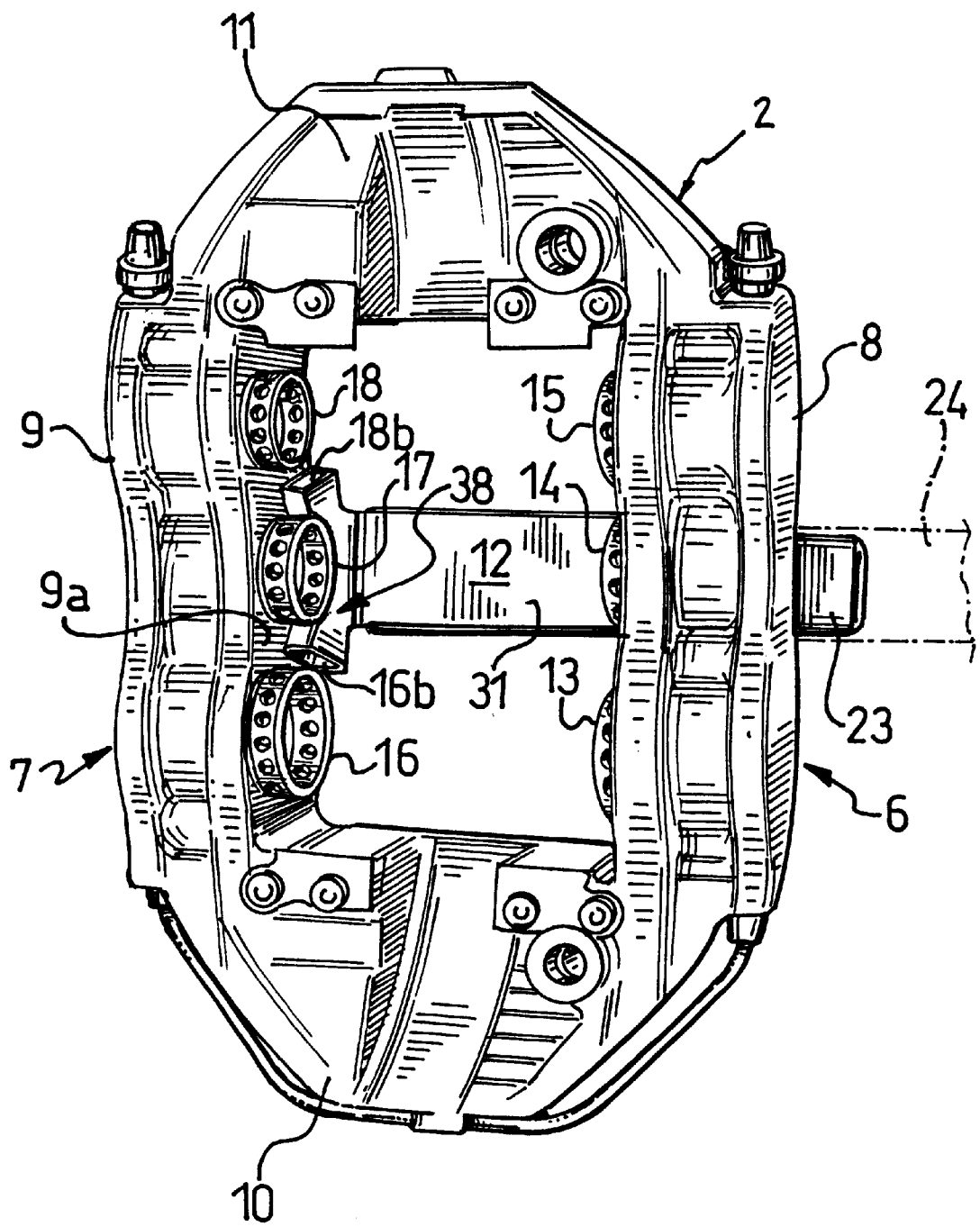
FIG. 4 is a perspective view, taken on the arrow IV, showing the detail of FIG. 3, substantially from below.
Figure 5:
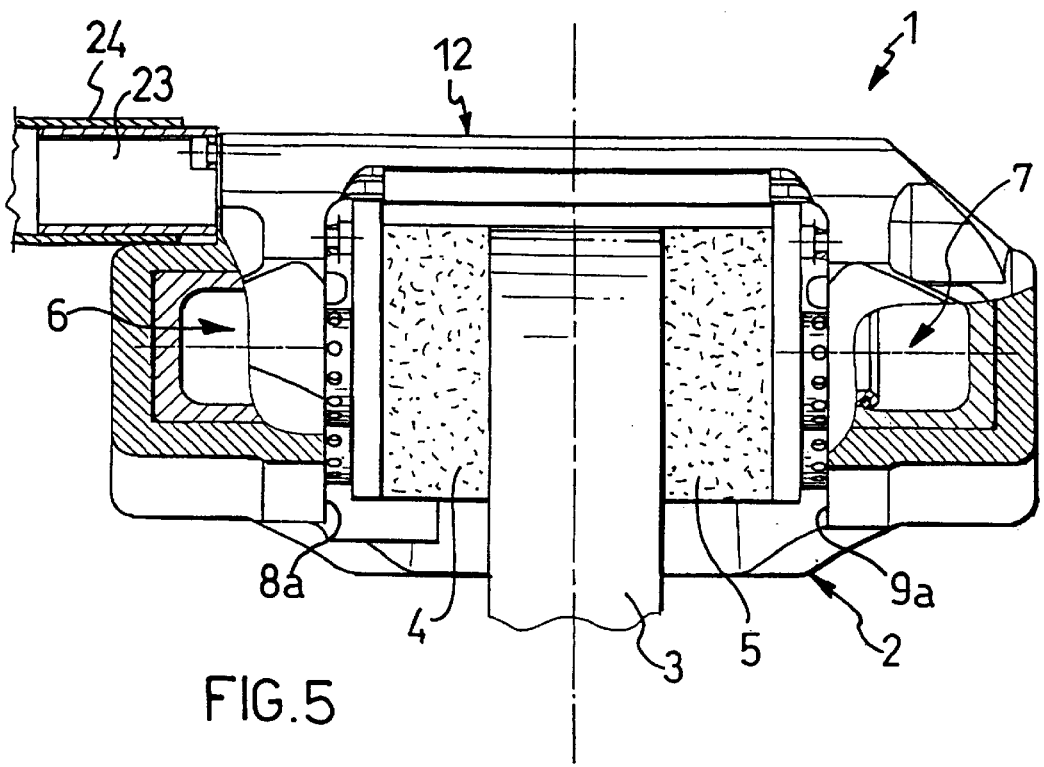
FIG. 5 is a partially-sectioned view of the disk brake of FIG. 1, taken on the arrow V.
Figure 6:
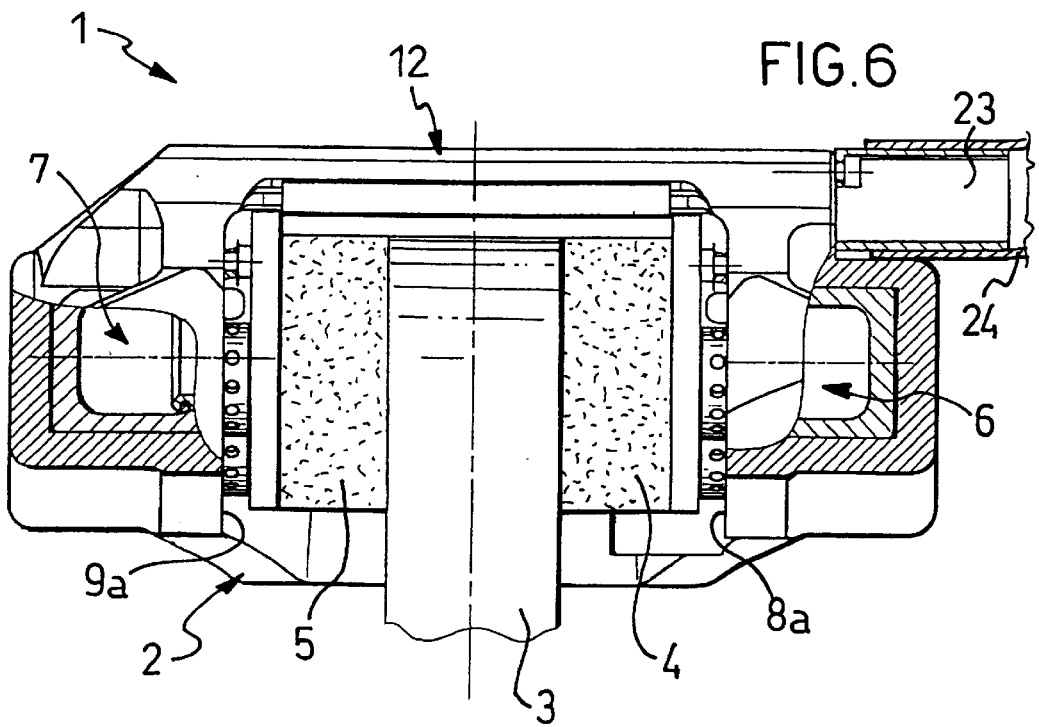
FIG. 6 is a partially-sectioned view of the disk brake of FIG. 1, taken on the arrow VI.
Figure 8:
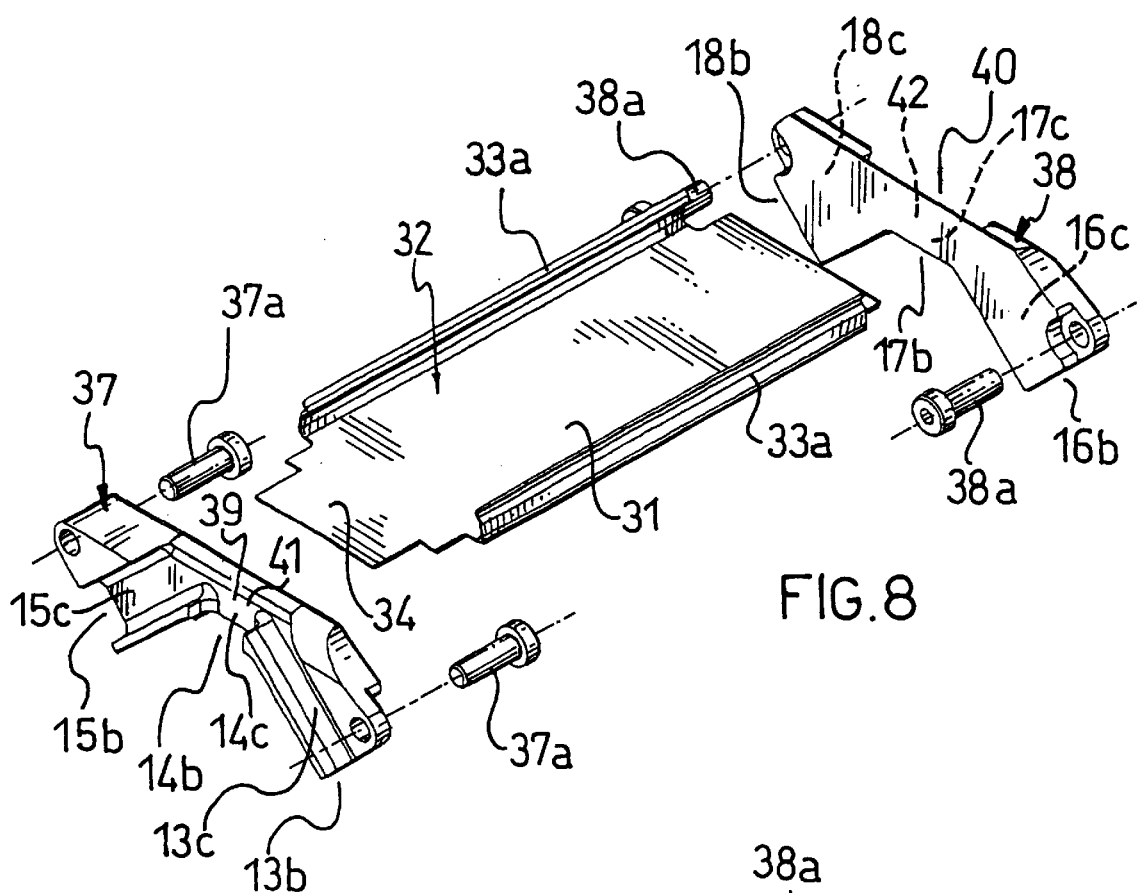
FIG. 8 is a perspective view of the detail of FIG. 7, with parts separated.
Figure 7:
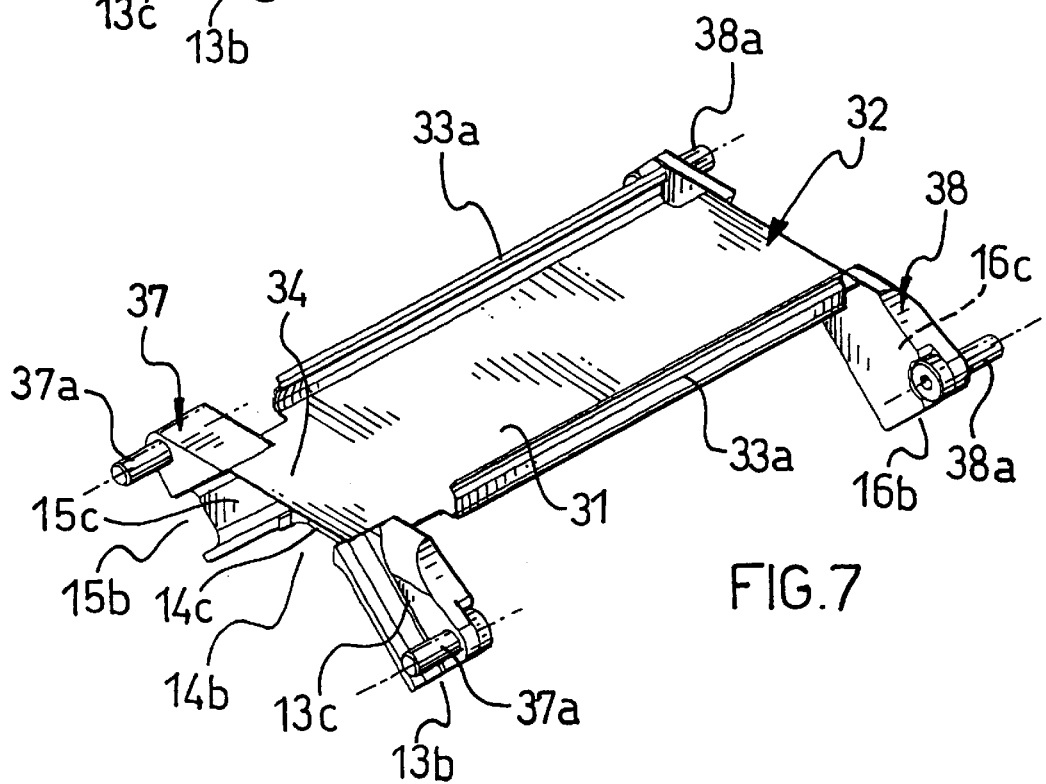
FIG. 7 is a perspective view of a detail of the disk brake of FIG. 1.

With reference to the appended drawings, a disk brake for a motor-vehicle in general, and for a racing car or, in any case, high-powered car in particular, is generally indicated 1.

The disk brake 1 comprises a caliper body 2 and a disc 3 both for fixing to a hub of the motor vehicle for the attachment of a vehicle wheel.

Two pads 4 and 5 mounted on the caliper body 2 are acted on by respective pressure means 6 and 7, supported by the caliper body 2 and, more precisely, supported by the elongate hub-side element 8 and by the elongate wheel-side element 9, respectively.

The caliper body 2 is formed as a single piece of aluminium alloy with good mechanical characteristics, by machining, from a semi-finished blank, for example a rolled section, or from a moulded piece. The caliper body comprises a hub-side elongate element 8 and a wheel-side elongate element 9. The elongate elements 8 and 9 have respective flat inner surfaces 8a and 9a facing towards the disk 3 and extend substantially tangentially relative to the disk 3. They support and house the respective pressure means 6 and 7.

The caliper body 2 is completed by three connecting bridges 10, 11 and 12 formed integrally with the elongate elements 8 and 9 and extending like bridges over the disk 3. The purpose of the bridges 10, 11 and 12 is to interconnect the elongate elements 8 and 9 rigidly.

More precisely, the three connecting bridges comprise two end connecting bridges 10 and 11 which connect the front and rear ends of the elongate elements 8 and 9 and a central connecting bridge 12 which connects the elongate elements at two intermediate points thereof.

In the embodiment shown, the pressure means 6 housed in the hub-side elongate element 8 comprise three hydraulic pistons 13, 14 and 15 spread out along the length of the elongate element 8 and having diameters which decrease from the first, front piston 13 to the last, rear piston 15.

Similarly, the pressure means 7 housed in the wheel-side elongate element 9 comprise three hydraulic pistons 16, 17 and 18 spread out along the length of the elongate element 9 and having diameters which also decrease from the first, front piston 16 to the last, rear piston 18.

It should be noted that each piston has an active end which is in contact with the pad. These active ends are formed generally so as to dissipate heat, that is, to reduce the amount of heat which passes from the pads to the brake fluid.

In the embodiment shown, these active ends, which are called radiator elements, have openings in the form of circular holes, which are indicated in the drawings by reference numerals 13a to 18a each of which relates to a respective one of the pistons 13 to 18.

The disk brake 1 according to the present invention comprises a duct 19 provided for the passage of cooling air for cooling the radiator elements 13a–18a, the duct 19 being formed inside the caliper body 2.

The duct 19 advantageously extends through the central bridge 12 from an end 12a of the duct disposed adjacent the hub-side elongate element 8 and extends between an inlet opening 20 and two outlet openings 21 and 22 disposed at the height of and facing the radiator elements 13a, 14a and 15a and the radiator elements 16a, 17a and 18a, respectively.

The inlet opening 20 preferably has a connector 23 for the connection of the duct 19 to a cooling-air feed pipe 24, for example, for air coming from a suitable air-intake of the motor-vehicle.

The duct 19 has a first portion 25 in the form of a hole extending in an end portion 27 of the central bridge 12 disposed adjacent the hub-side elongate element 8, as well as a second portion 26 extending along and inside a central portion 28 of the central bridge as far as an end portion 29. The second portion 26 is constituted by a channel 30 formed in the central bridge 12 facing the disk 3 and covered by a wall 31 of a sheet-steel cover 32 snap-engaged on the central portion 28 of the bridge. For this purpose, the cover 32 comprises flanges 33a which are bent at right angles and snap-engage grooves 33b formed in the bridge.

It should be noted that the wall 31 is extended inside the first portion 25 by an appendage 34 which extends for about half of the length of the first portion. This appendage 34 divides this half of the first portion into two branches 35 and 36, of which one 35 is directed towards the opening 21 and the other 36 is directed towards the opening 22.

The outlet openings 21 and 22 preferably comprise respective diffuser bodies 37 and 38 which are substantially fan-shaped and are fixed to the elongate elements. 8 and 9 by means of respective pairs of screws 37a and 38a. These diffuser bodies 37 and 38, which are made of aluminium alloy, have respective inlet openings 39 and 40 for the supply of the cooling air. The diffuser bodies 37 and 38 have, respectively, three outlet openings 13b, 14b and 15b, spread out like a fan and three outlet openings 16b, 17b and 18b also spread out like a fan, all directly facing and close to the respective radiator elements.

In particular, respective ducts 41 and 42 formed in the diffuser bodies 37 and 38 extend respectively, from the inlet openings 39 and 40 and branch, respectively, into three ducts 13c, 14c and 15c opening from the outlet openings 13b, 14b and 15b directly onto the radiitor elements 13a, 14a and 15a, and into three ducts 16c, 17c and 18c opening from the outlet openings 16b, 17band 18b directly onto the radiator elements 16a, 17a and 18a.

It should be noted that each diffuser body 37, 38 is in the form of a half-shell in which the ducts are formed as channels. When each diffuser body 37, 38 is fixed by the screws 37a, 38a to the respective elongate element 8, 9 in a position against the internal surfaces 8a, 9a, the half-shell, and hence also its channels, are covered by the elongate body.

In operation, the cooling air coming from an airintake of the motor vehicle passes through the pipe 24, reaches and passes through the duct 19 until it reaches the diffuser bodies 37, 38 and the outlet openings. The cooling air emerges from these and passes directly over the radiator elements.

By virtue of the fact that the outlet openings reach into the immediate vicinity of the radiator elements which they face in close proximity, the cooling is highly effective.

If the pads have to be replaced because they are worn, the caliper body can be removed from the wheel hub directly, simply by detaching the pipe from the connector.

Finally, the disk brake according to the present invention has the advantage of unusually effective cooling of the radiator elements and the brake oil is in practice not susceptible to boiling.

A further advantage of the disk brake according to the present invention lies in the simplicity of the operations to be performed in order to replace the pads.

A further advantage of the disk brake according to the present invention is that it is also structurally simple since the cooling-air duct is formed in an industrially advantageous manner by machining during the manufacture of the caliper body.

It should also be noted that the disk brake according to the present invention is also structurally strong and functionally reliable.

Naturally, in order to satisfy contingent and specific requirements, an expert in the art may apply to the disk brake of the present invention many modifications and variations all of which, however, are included within the scope of protection of the invention as defined by the following claims.

What is claimed is:

1. A disk brake comprising:
    a caliper body, in which a hub-side elongate element, a wheel-side elongate element and connecting bridges extending astride a disk constitute a single part;
    pressure means housed in the elongate elements and acting on respective pads by means of radiator elements;
    a duct for the passage of cooling air;
    said duct formed inside the caliper body and extending between an inlet opening, and at least one outlet opening reaching into the immediate vicinity and directly facing at least one radiator element of the radiator elements; and
    a cooling-air feed pipe coupled to said duct for supplying air from an air-intake of a motor vehicle.

2. A disk brake according to claim 1, wherein the duct extends inside at least one of the bridges from an end disposed adjacent the hub-side elongate element.

3. A disk brake according to claim 2, wherein there are three connecting bridges, that is, a central bridge and two end bridges, and in that the duct is formed inside the central bridge.

4. A disk brake according to claim 3, wherein the duct formed inside the central bridge comprises an outlet opening disposed at the height of the radiator elements of the pressure means of the hub-side elongate element and an outlet opening disposed at the height of the radiator elements of the pressure means of the wheel-side elongate element.

5. A disk brake according to claim 4, wherein the pressure means comprise three pistons for each elongate element, each piston having a respective radiator element, and in that each outlet opening comprises a diffuser body having three outlets in a fan-like arrangement.

6. A disk brake according to claim 5, wherein each diffuser body is in the form of a half-shell in a position against the respective elongate element.

7. A disk brake according to claim 5, wherein the duct formed inside the central bridge is constituted by a channel formed in the central bridge and facing towards the disk, and by a wall of a cover snap-engaged on the bridge to cover the channel.

8. A disk brake according to claim 7, wherein the wall comprises an appendage extending into a first portion of the duct.

9. A disk brake comprising:
    a caliper body, in which a hub-side elongate element, a wheel-side elongate element and connecting bridges extending astride a disk constitute a single part;
    pressure means housed in the elongate elements and acting on respective pads by means of radiator elements;
    a duct for the passage of cooling air, formed inside the caliper body and extending between an inlet opening, and at least one outlet opening facing at least one radiator element of the radiator elements, wherein said bridges comprise a central bridge and two end bridges, said duct formed inside the central bridge.

10. A disk brake according to claim 9, wherein the duct formed inside the central bridge comprises an outlet opening disposed at the height of the radiator elements of the pressure means of the hub-side elongate element and an outlet opening disposed at the height of the radiator elements of the pressure means of the wheel-side elongate element.

11. A disk brake according to claim 10, wherein the pressure means comprise three pistons for each elongate element, each piston having a respective radiator element, and in that each outlet opening comprises a diffuse body having three outlets in a fan-like arrangement.

12. A disk brake according to claim 11, wherein each difuser body is in the form of a half-shell in a position against the respective elongate element.

13. A disk brake according to claim 11, wherein the duct formed inside the central bridge is constituted by a channel formed in the central bridge and facing towards the disk, and by a wall of a cover snap-engaged on the bridge to cover the channel.

14. A disk brake according to claim 13, wherein the wall comprises an appendage extending into a first portion of the duct.

15. A disk brake comprising:
a caliper body, in which a hub-side elongate element, a wheel-side elongate element and connecting bridges extending astride a disk constitute a single part;
pressure means housed in the elongate elements a portion of said pressure means acting on respective pads;
a duct for the passage of cooling air;
said duct formed inside the caliper body and extending between an inlet opening, and at least one outlet opening reaching into the immediate vicinity and directly facing said pressure means; and
a cooling-air feed pipe coupled to said duct for supplying air from an air intake of a motor vehicle.

16. A disk brake according to claim 15, wherein the duct extends inside at least one of the bridges from an end disposed adjacent the hub-side elongate element.

17. A disk brake according to claim 16, wherein there are three connecting bridges, that is, a central bridge and two end bridges, and in that the duct is formed inside the central bridge.

18. A disk brake according to claim 17, further comprising a radiator element, wherein the duct formed inside the central bridge comprises an outlet opening disposed at the height of said radiator elements of the pressure means of the hub-side elongate element and an outlet opening disposed at the height of said radiator elements of the pressure means of the wheel-side elongate element.

19. A disk brake according to claim 18, wherein the pressure means comprise three pistons for each elongate element, each piston having a respective radiator element, and in that each outlet opening comprises a diffuser body having three outlets in a fan-like arrangement.

20. A disk brake according to claim 19, wherein each diffuser body is in the form of a half-shell in a position against the respective elongate element.

21. A disk brake according to claim 19, wherein the duct formed inside the central bridge is constituted by a channel formed in the central bridge and facing towards the disk, and by a wall of cover of a snap-engaged on the bridge to cover the channel.

22. A disk brake according to claim 21, wherein the wall comprises an appendage extending into a first portion of the duct.

23. A disk brake comprising:
a caliper body, in which a hub-side elongate element, a wheel-side elongate element and connecting bridges extending astride a disk constitute a single part;
pressure means housed in the elongate elements and acting on respective pads by means of radiator elements, wherein the pressure means comprise three pistons for each elongate element, each piston having a respective radiator element, and in that each outlet opening comprises a diffuse body having three outlets in a fan-like arrangement; and
a duct for the passage of cooling air, formed inside the caliper body and extending between an inlet opening, and at least one outlet opening facing at least one radiator element of the radiator elements, wherein said bridges comprise two end bridges, said duct formed inside the end bridges.

24. A disk brake according to claim 23, wherein each diffuser body is in the form of a half-shell in a position against the respective elongate element.

* * * * *

UNITED STATES PATENT AND TRADEMARK OFFICE
CERTIFICATE OF CORRECTION

PATENT NO.    : 6,446,766 B1
DATED         : September 10, 2002
INVENTOR(S)   : Raffaello Cornolti et al.

It is certified that error appears in the above-identified patent and that said Letters Patent is hereby corrected as shown below:

<u>Title page,</u>
Item [30], should read -- Application No. 98830806.0 filed: December 31, 1998
Country: EPO Signed and Sealed this Seventeenth Day of December, 2002

JAMES E. ROGAN
*Director of the United States Patent and Trademark Office*